(12) United States Patent
Lew et al.

(10) Patent No.: US 8,652,380 B2
(45) Date of Patent: Feb. 18, 2014

(54) METHOD OF MAKING A BICYCLE RIM

(75) Inventors: Paul Lew, Las Vegas, NV (US); Richard A. Steinke, Boulder City, NV (US)

(73) Assignee: Reynolds Cycling LLC, West Jordan, UT (US)

( * ) Notice: Subject to any disclaimer, the term of this patent is extended or adjusted under 35 U.S.C. 154(b) by 112 days.

(21) Appl. No.: 13/238,973

(22) Filed: Sep. 21, 2011

(65) Prior Publication Data

US 2012/0006470 A1    Jan. 12, 2012

Related U.S. Application Data

(63) Continuation of application No. 10/343,535, filed on Oct. 17, 2003, now abandoned, and a continuation of application No. 09/668,867, filed on Sep. 25, 2000, now Pat. No. 6,347,839.

(51) Int. Cl.
*B32B 37/14*        (2006.01)

(52) U.S. Cl.
USPC ........... 264/258; 264/129; 264/156; 264/163; 264/313; 264/314; 264/317; 156/184; 156/190; 156/193; 425/577

(58) Field of Classification Search
USPC ......... 264/129, 156, 163, 258, 313, 314, 317; 156/184, 190, 193; 425/577
See application file for complete search history.

(56) References Cited

U.S. PATENT DOCUMENTS

| | | | |
|---|---|---|---|
| 2,762,419 A * | 9/1956 | Prewitt | 156/189 |
| 4,561,481 A * | 12/1985 | Kawauchi et al. | 152/379.3 |
| 4,588,542 A * | 5/1986 | Pierce | 264/45.5 |
| 5,540,485 A * | 7/1996 | Enders | 301/104 |
| 5,632,940 A * | 5/1997 | Whatley | 264/46.4 |
| 5,902,447 A * | 5/1999 | Johnson et al. | 156/499 |
| 5,985,072 A * | 11/1999 | Finck et al. | 156/184 |
| 6,224,165 B1 * | 5/2001 | Mercat et al. | 301/58 |
| 6,761,847 B2 * | 7/2004 | Meggiolan | 264/257 |
| 7,258,402 B2 * | 8/2007 | Meggiolan | 301/95.103 |
| 7,651,654 B2 * | 1/2010 | Meggiolan | 264/315 |
| 2002/0108249 A1 * | 8/2002 | Meggiolan | 29/895.3 |

* cited by examiner

*Primary Examiner* — Monica Huson
*Assistant Examiner* — Saeed Huda
(74) *Attorney, Agent, or Firm* — Steven L. Nichols; Van Cott, Bagley, Cornwall & McCarthy P.C.

(57) ABSTRACT

A method of manufacturing a rim for a bicycle wheel includes wrapping plys of fibers in a resin matrix around a mandrel; curing the plys to form the rim; and reducing a size of the mandrel to allow the mandrel to be removed from the rim.

20 Claims, 7 Drawing Sheets

000

METHOD OF MAKING A BICYCLE RIM

RELATED APPLICATIONS

The present application is a continuation, and claims the priority under 35 U.S.C. §120, of previous U.S. patent application Ser. No. 10/343,535, filed Oct. 17, 2003, which claims the priority of previous international application PCT/US00/42246, filed Nov. 20, 2000, which claimed the priority of U.S. patent application Ser. No. 09/668,867, filed Sep. 25, 2000, now U.S. Pat. No. 6,347,839. Applicant claims the priority of all and each of these previous applications, which are hereby incorporated by reference in their respective entireties.

BACKGROUND

Traditionally, wheel rims have been constructed utilizing very old stamping processes from metal, typically steel or aluminum, and while such rims are in common use, they possess several undesirable characteristics. Steel metal wheel rims corrode, and aluminum wheel rims are prone to dent and deform, and both types of rims generally offer only silver color as a finish option. Further, such stamping processes on aluminum require rolling, bending, stamping, and piercing metal that often creates micro-fractures and weakened areas of the metal that, in turn, must be heavily reinforced to create sufficient strength to endure over a predictable rim life-span. For a steel rim, while the stamping processes create little damage to the metal, such stamping processes are very capital intensive, requiring heavy forming equipment with significant maintenance requirements. In practice, the industry recognized that a steel rim, with its excessive weight, unattractive appearance and tendency to corrosion, is not a popular item with consumers. For example, in North America and Western Europe, manufactures of steel rims are forced to operate at very low profit margins.

Presently, wheel rims constructed from a glass, carbon and graphite fibers that are attractive to consumers have generally been prohibitively expense for an average bicycle enthusiast. An example of a high quality composite rim whose construction is labor intensive and thus must be sold at a high price is shown in a U.S. Patent Application entitled "A Two Component Composite Bicycle Rim", Ser. No. 09/548,068, filed Apr. 12, 2000, by one of the present inventors.

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

Figure 1:
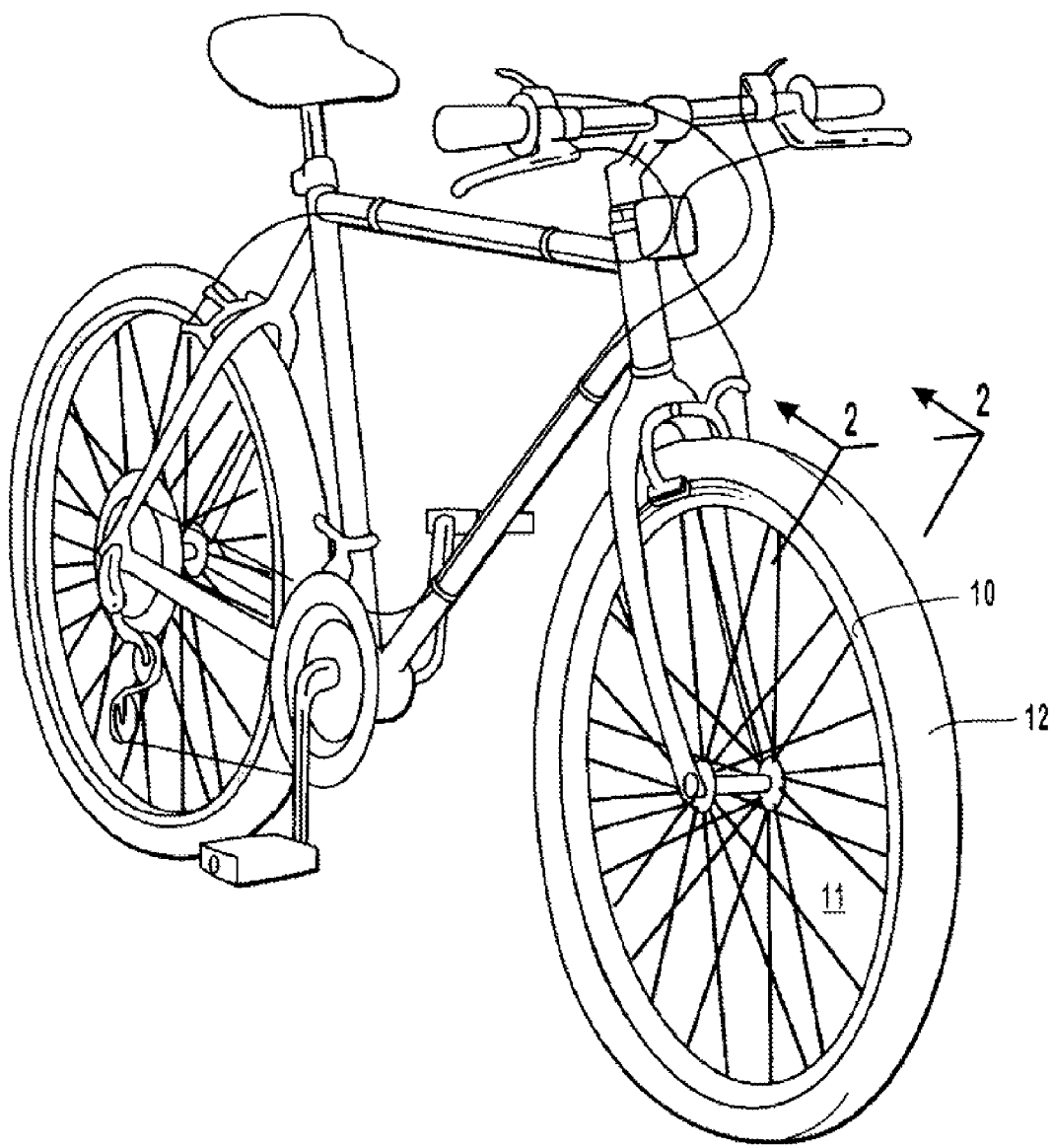
FIG. 1 is an elevation perspective view from the front and side of a bicycle having wheels that include the rims of the invention.

The present disclosure provides a composite rim that is formed as a more universal and less expensive bicycle rim, from inexpensive materials, for example carbon plys or glass fibers, and utilizes apparatus and method for its manufacture that are more efficient and labor saving. A rim made according to the principles disclosed herein is therefore as strong as a steel rim and is as light in weight as a comparable aluminum rim, can be attractively finished, and is less expensive and accordingly has a broader sales appeal in the market place that steel or aluminum rims. Heretofore, within the knowledge of the inventors, a composite rim like that of the invention for mounting tires formed with continuous side wall mounting grooves has not been known.

The present specification relates to composite bicycle wheel rims and other like wheel rims where multiple resin impregnated layers or "plys" of fibers are applied at selected crossing angles onto a mandrel to form a laminate, with heat and pressure applied thereto in a molding process to cure the laminate into a composite hook bead type rim that has inwardly pointing hook ends for fitting into locking grooves formed around a tire side walls.

A composite bicycle rim, or like rim has heretofore usually been constructed in sections from layers or plys of unidirectional fiber layers that are laid up, one layer over another, on a mandrel, forming a laminate that is then cured under heat and pressure, with the rim sections then finished, assembled and secured together along section junctions, forming a continuous rim. The present disclosure provides, in a single operation, forming a continuous unwarped composite hook bead type rim having side walls whose upper ends are formed as inwardly pointing hooks that are for fitting into side wall grooves of a molded tire, for mounting the tire onto the rim. The rim is preferably a laminate constructed by laying up, one over the other, mats or plys of resin coated or impregnated fiber glass onto a circular mandrel whose width can be reduced to pass between the rim side hook ends. The mandrel, as shown, includes movable or removable center sections that, when removed, shorten the distance across the mandrel so as to allow it, after laminate rim curing, to be conveniently removed from between the rim side wall hook ends. The hook ends are then shaped, as with a turning router blade, or the like, to extend inwardly a required distance from the rim inner side wall ends to hook into the tire side wall grooves.

To form the rim of the invention, mats or plys of resin epoxy impregnated or coated directional glass fibers are sequentially laid up, one over the another, forming a laminate, with the fiber direction of each mat or ply laid over a prior mat or ply such that the fibers are at a different crossing angles, providing a stack of fiber glass mats or plys where the crossing angles of the fibers of each mat or ply are at a selected angle to adjacent mats. So arranged, a laminate is formed having an architecture that is balanced and interlocking, providing a finished rim that is free from residual stress, without stress risers and is dimensionally stable and unwarped.

In one example, a stack of mats containing twenty four (24) discrete resin impregnated mats or plys of fiber glass, each of a thickness of from twenty eight (28) to thirty four (4) thousands (1000) of an inch, are laid up as a laminate on a mandrel for curing to form the rim. The twenty (24) plys are grouped in six (6) identical groups of four (4) plys each that are arranged to cross at the design crossing angles, and repeat in each of the six (6) identical groups. The first ply in a group is preferably parallel to the mold circumference, and the last ply in the group, is preferably, perpendicular to a tangent to the mold circumference, with the fibers of the center two (2) plys at crossing angles of less than ninety (90) and greater than forty five (45) degrees to one another. So arranged, after curing the laminate is removed off of the mandrel by a reduction of the mandrel cross section to allow the mandrel or mandrel sections to be slid past the inwardly pointing rim hook ends. So arranged, the rim shape will remain undeformed and faithful to the cavity of the mold.

After curing and removal from the mold, the rim hook ends as have been formed by bending the edges of the plys over the mandrel edges, are finished, as with a router. This finishing provides a required hook end distance from the rim interior side wall surfaces, and a desired spacing distance between the hook ends to allow a tire side walls to be fitted into the rim to with the hook ends passing into the tire side wall continuous grooves, mounting the tire mounting onto the rim. Prior to which tire mounting, the rim is drilled to receive spokes that radiate inwardly therefrom to fit to a hub, forming a wheel. The rim, with the drilled spoke holes, preferably receives a urethane polymer coating applied thereover that enhances the overall rim strength and finish quality, creating a smooth, colorful appearance that is unaffected by ultra-violet rays, moisture, salt-water, most chemicals, and most cleaners.

The present disclosure provides a continuous composite rim that is preferably formed as a laminate from inexpensive glass fiber mats or plys coated with an epoxy resin that are laid up in groups of mats or plys, with crossing angles between the plys selected to provide, a balanced laminate where the laminate, after curing, is free of stress risers and is dimensionally stable.

The present disclosure also provides a composite rim that is conveniently and economically formed by laying up epoxy risen impregnated fiber mats or plys over a mandrel where upper ends of rim walls are formed as inwardly pointing hook ends by bending mat or ply along the mandrel parallel edges with, after curing in a mold, the mandrel wall to collapse, shortening its width, so as to allow the mandrel to pass between the hook ends that are each then machined to a desired distance from the surfaces of the rim interior walls to accommodate and mount to mounting grooves in a tire side walls.

The present disclosure also provides a composite rim that is easy and economical to manufacture to provide a rim that is of like weight to a comparable aluminum rim and is as strong as a steel rim at lower weight than such comparable steel rim, and can be painted or otherwise colored to present an attractive appearance.

The present disclosure also provides a composite rim that, after fabrication, can be easily drilled to accommodate radially mounted spokes thereto that connect to a hub, forming a bicycle wheel.

The present disclosure also provides a rim that receives a urethane polymer coating after curing to enhance overall rim strength and finish quality, creating a smooth, colorful appearance that is unaffected by ultra-violet rays, moisture, salt-water and most chemicals and cleaners.

The invention, as is hereinafter described, relates to a composite bicycle rims, and other vehicle rims, that are formed as a full rims. The composite rim of the invention is formed by laying-up successive layers of fiber mat or plys, as a laminate, that are, for example, fiber glass mats or plys, but may be carbon, graphite, boron, or other appropriate fiber mats or plys, within the scope of this disclosure. The mats or plys are coated or impregnated with an epoxy thermoset resin, or a nylon thermo plastic resin, or the like, and fitted onto a mandrel. The mats or plys are preferably laid up on the mandrel in groups of four plys each, and the mandrel whereon they are laid up is then fitted into a mold cavity that is closed with heat and pressure are applied to the laminate, curing the laminate that emerges as a full rim.

Figure 2:
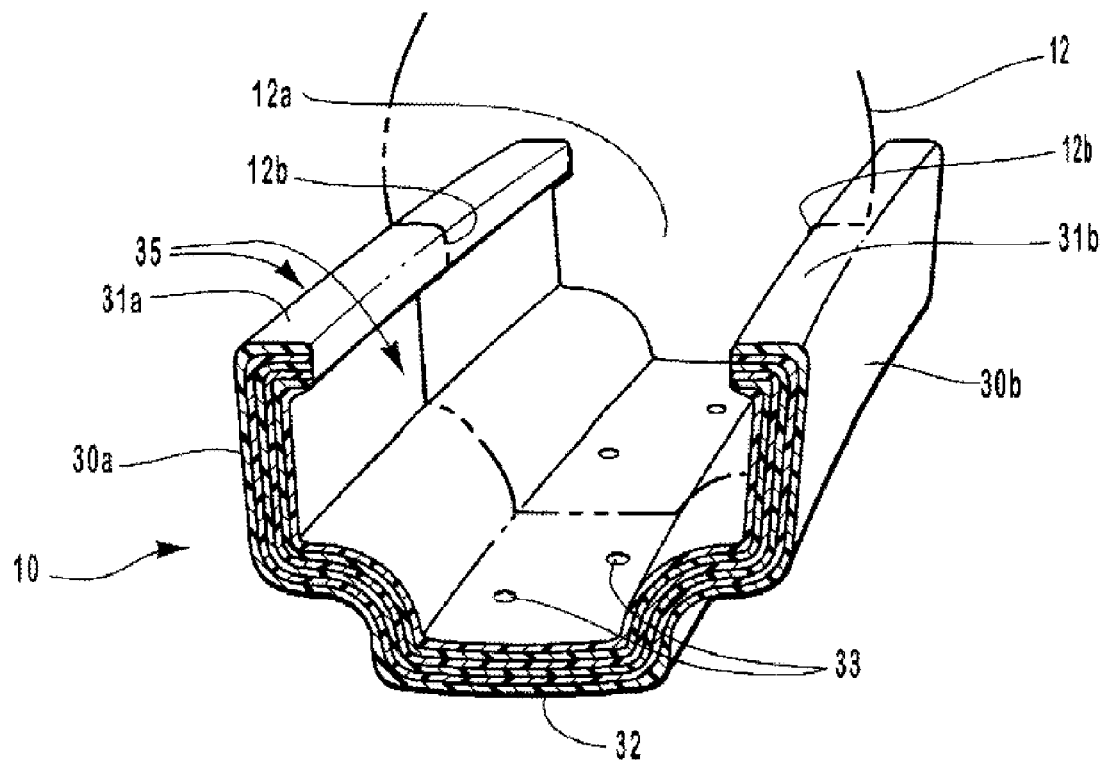
FIG. 2 is an enlarged end sectional view taken along the line 2-2 of FIG. 1, showing a section of the rim of the invention wherefrom the spoke ends have been removed, and showing, in broken lines, a section of a solid spin cast urethane tire fitted to the rim.
Figure 3A:
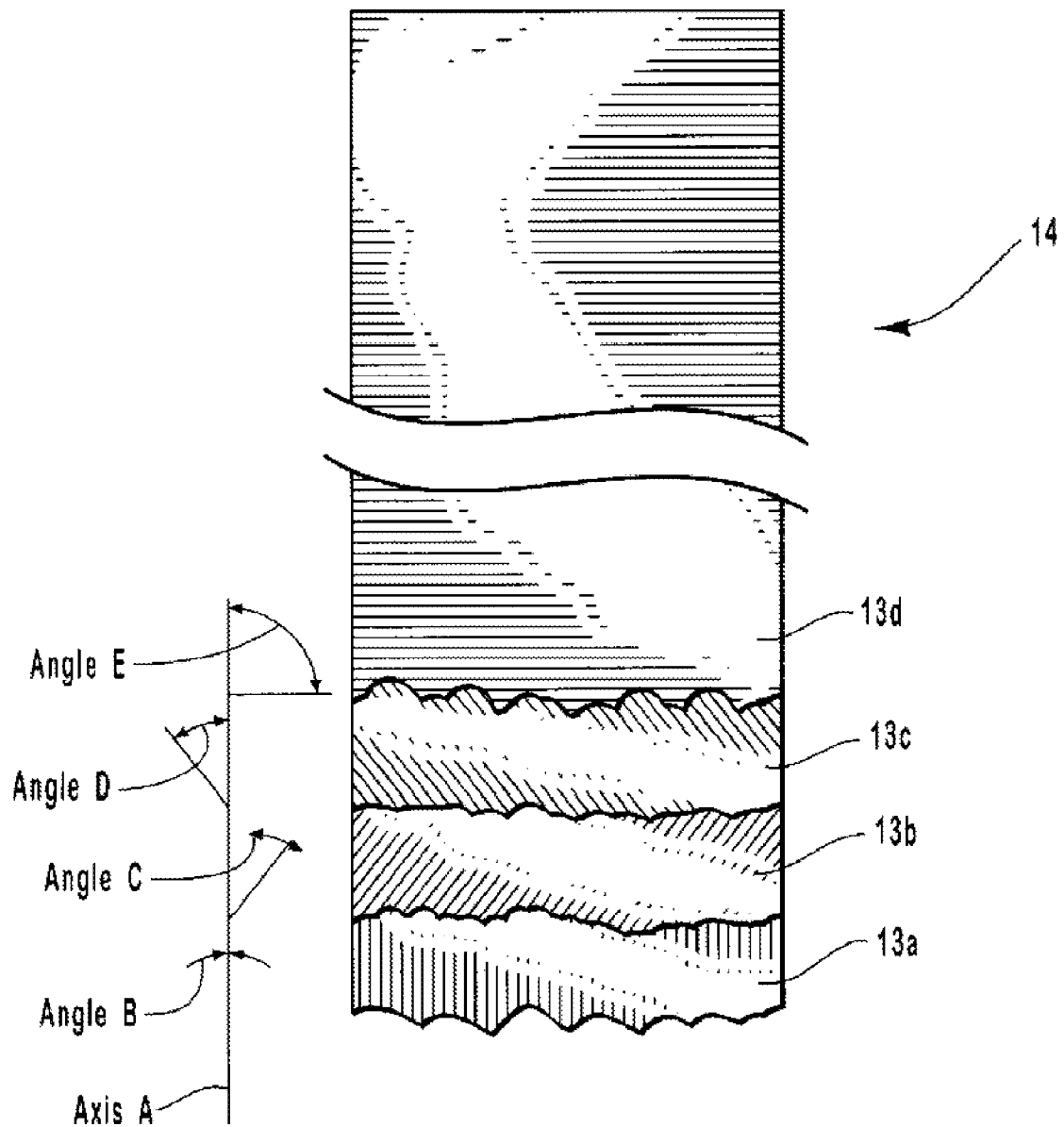
FIG. 3A shows a group of four plys of resin impregnate fiber mats that overlay one another at crossing angles of a first or bottom layer of fibers at angle B to vertical axis A, followed by a second layer whose fibers are at angle C to vertical axis A, followed by a third layer whose fibers are at angle D to vertical axis A, with a fourth, or top layer, having fibers are at angle E to vertical axis A.
Figure 3B:
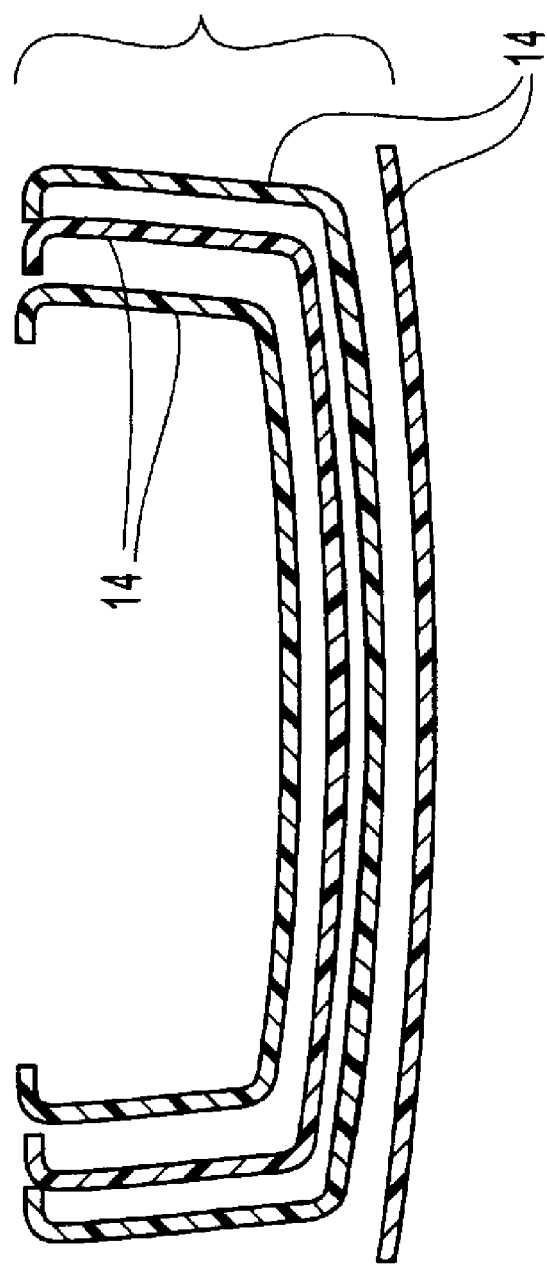
FIG. 3B shows the identicals groups of layers of FIG. 3A laid up, one over the other.
Figure 4:
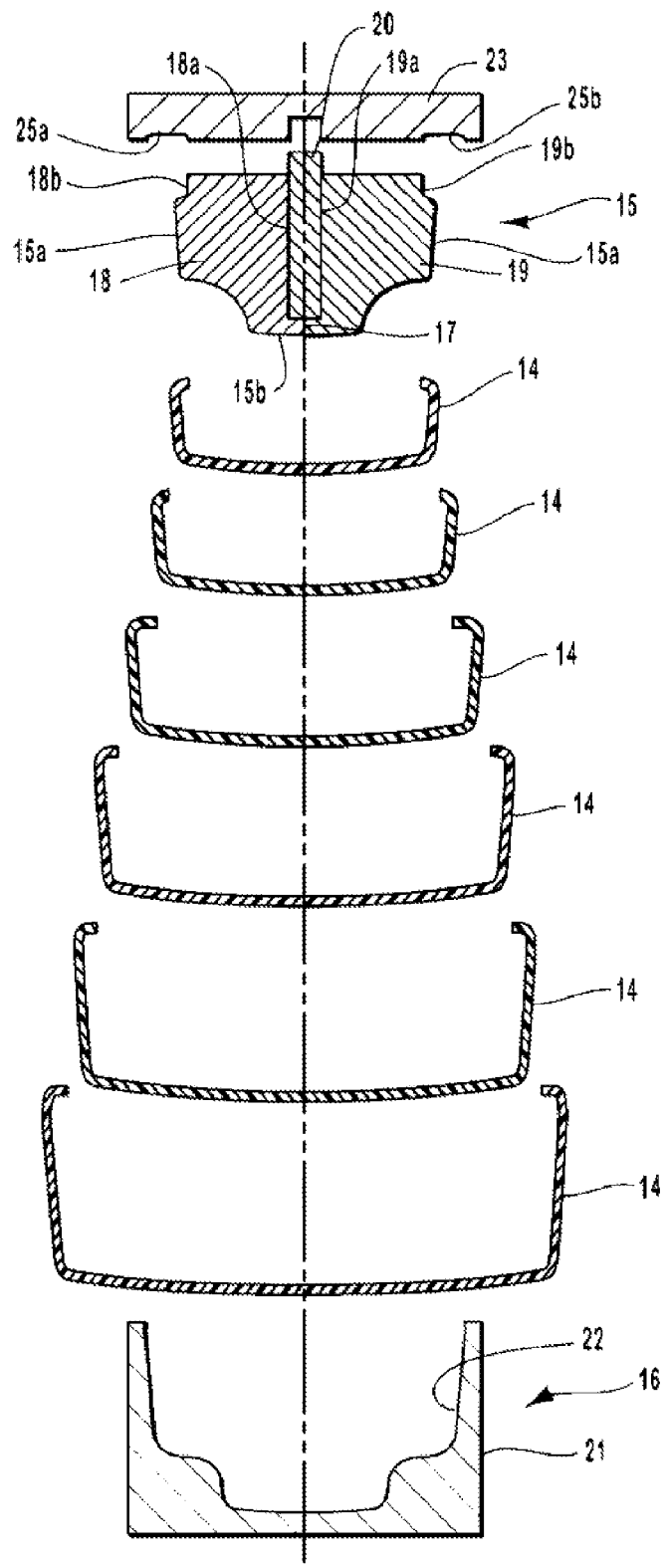
FIG. 4 shows the preferred twenty four (24) plys laid up in repeating groups of four (4) plys each aligned for placement against a mandrel forming a laminate having the shape of the rim open area between the rim side walls, with the top group to be laid up first, followed be the next group down, and so on, with the side edges of each group of plys to be bent over the mandrel edges, forming a hook bead type rim hook ends, and showing the laminate coated mandrel aligned for fitting in the cavity of a mold to receive a mold cap thereover.
Figure 5:
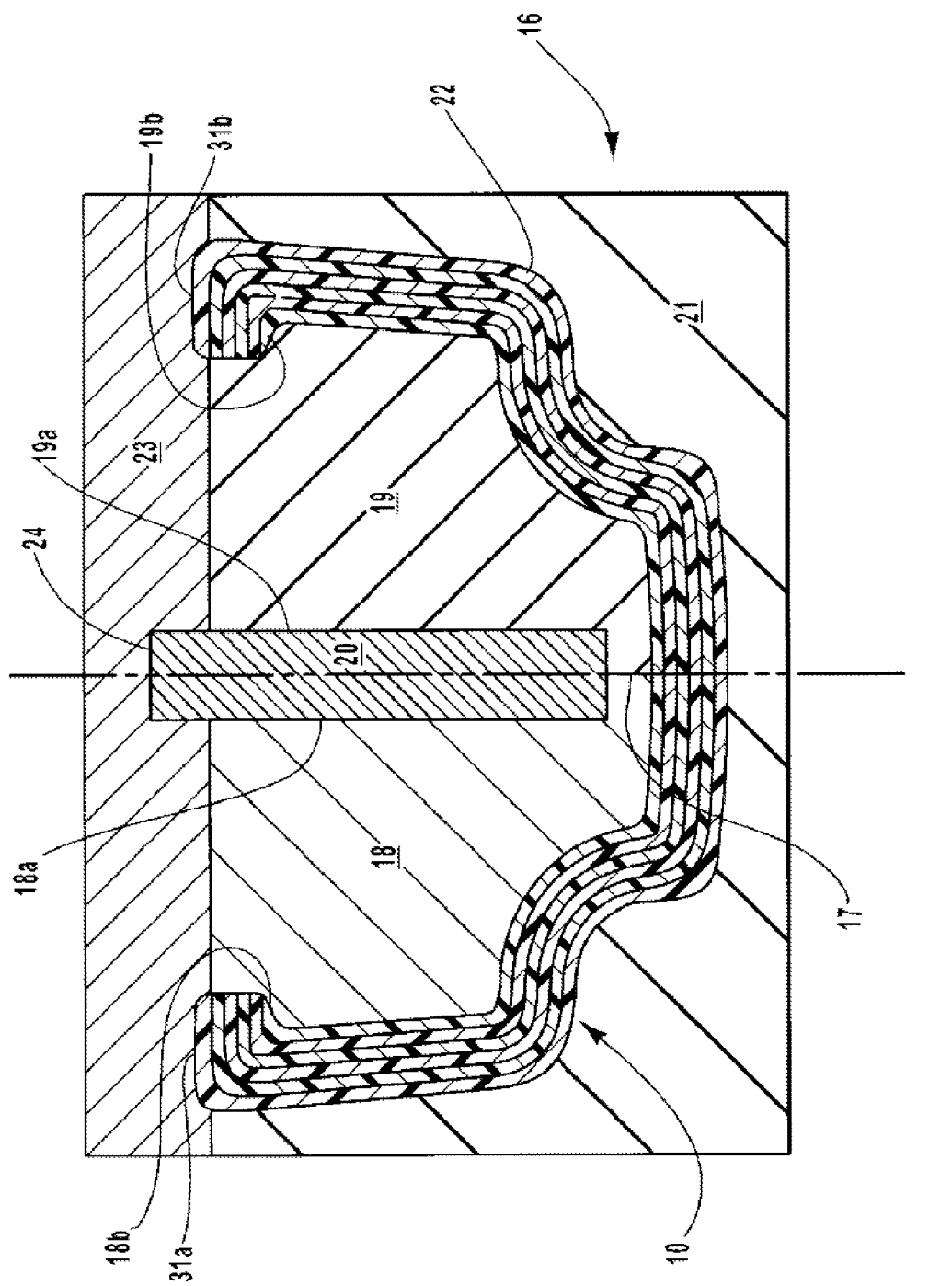
FIG. 5 shows an enlarged end sectional view of the groups of plys laid up on the mandrel of FIG. 4, and fitted into the mold that includes the cap, and showing the mandrel as having a removable center section.
Figure 6:
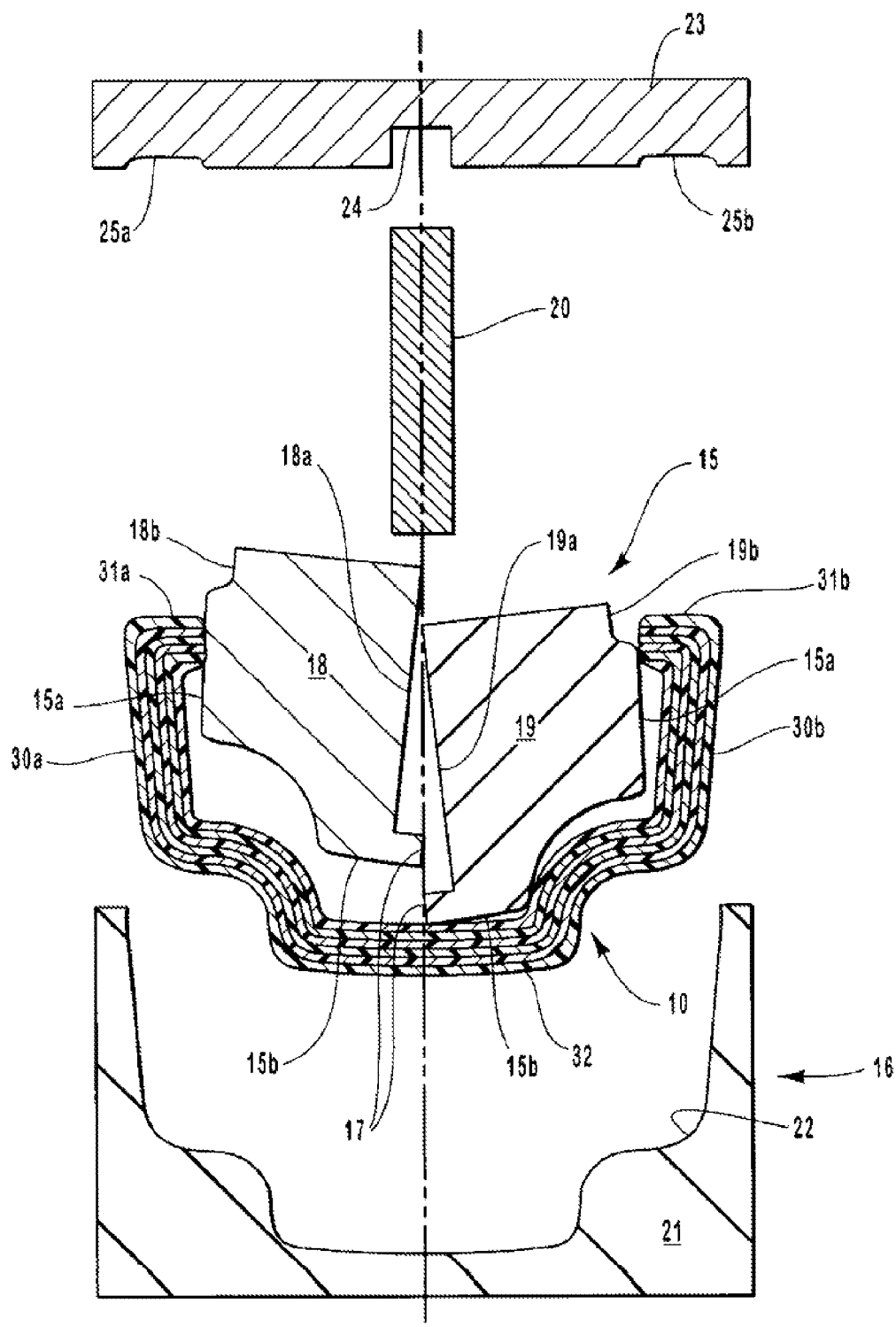
FIG. 6 shows the mandrel, groups of fiber plys and mold of FIG. 5 exploded apart, and shows the center of the mandrel as having been removed, allowing half sections of the mandrel to be tilted towards one another and pass between the rim side wall hook ends.

As shown in FIG. 1, a rim formed by the principles disclosed herein is fitted with spokes and a hub as a wheel 11 mounting a bicycle tire 12. Though, of course, a rim for another appropriate vehicle could be formed like that of the rim 10, within the scope of this disclosure. In FIG. 2, the rim 10 is shown as an enlarged section and includes a section of tire 12 fitted thereto, as shown in broken lines. The rim 10, as shown in FIGS. 2, 3B, 4, 5 and 6, is preferably formed from groups 14 of four (4) plys 13a, 13b, 13c and 13d, for each group 14 that are laid up upon a mandrel 15. The groups 14, as shown best in FIG. 4, are positioned over one another, for curing in a mold 16, as shown in FIGS. 4, 5 and 6. Shown in FIG. 3A, the individual plys 13a, 13b, 13c and 13d, of the four (4) plys that make up each group 14 are formed from fibrous mats or plys, preferably fiber glass mats or plys, forming a rim 10 that is as light as a comparable aluminum rim, but is less expensive than an aluminum rim, and which rim 10, when cured, is as strong as a comparable steel rim. Through, it should be understood, mats or plys of other fibers such as carbon, graphite, boron, or the like, could be so used within the scope of this disclosure.

The fibers of each ply are directional and are laid up in groups 14 on mandrel 15, as shown in FIG. 4. The groups 14, as set out above, are identical to one another and are formed, as shown in FIG. 3A, by laying up the four (4) plys that make up a group 14 onto mandrel 15. Starting from the bottom ply of FIG. 3A, ply 13a has its fibers are at zero degrees to Axis A and parallel to the mandrel circumference, and is first positioned on mandrel 15, followed by plys 13b, 13c, with ply 13d then positioned thereover with its fibers perpendicular to axis A and perpendicular to a tangent to the mandrel circumference.

To provide a strong, stable and balanced laminate that does not have residual stresses and so is dimensionally stable upon removal from the mold 16. The plys 13a, 13b, 13c and 13d are arranged at selected crossing angles. Such a balanced laminate, in practice, is not easily achieved, with proper fiber direction and selected laminate thickness required to achieve this optimal condition. If such balanced laminate is not achieved the casting will include stress risers and be dimensionally deformed.

In one example, for a rim 10, that is shown as a broad rim and is appropriate for use as part of a mountain bike wheel, the required laminate architecture requires that the fibers of the ply 13a be laid down at a zero angle to a vertical axis A, parallel to the circumference of the mold 16, with a next ply 13b laid thereon at, preferably, a plus thirty eight (38) degrees to the vertical axis A, followed by a next ply 13c laid thereover that, preferably, is at a minus thirty eight (38) degrees to the vertical axis A, with, finally, the ply 13d laid thereover, is, preferably, at ninety (90) degrees to vertical axis A, and is perpendicular to a tangent to the mold circumference, forming a group having a thickness of from between twenty eight (28) and thirty four (34) thousands (1000) of an inch. Accordingly, in practice, ply 13a is placed against the mandrel 15 surface, ply 13b is positioned over ply 13a, followed a placement of ply 13c over the ply 13b, and, finally, ply 13d is placed over ply 13c. So arranged, the bottom and top plys, 13a and 13d, respectively, are, respectively, aligned with, and are perpendicular to, the mold circumference, with the inner plys 13b and 13c, respectively, at design crossing angles to one another. For the single group 14, the plys crossing angles are therefore from zero (0) degrees to ninety (90) degrees, with the groups each crossing one another at their contact plys at ninety (90) degrees or at right angles. In practice, the center plys 13b and 13c crossing angles, as are preferred, are at, respectively, plus thirty eight (38) and minus (38) degrees, to axis A. Which crossing angles, however, can, in practice, be plus or minus five (5) degrees to the preferred plus thirty eight (38) and minus thirty eight (38) degrees and still maintain a desired ply bonding, as a balanced laminate. The balanced laminate will retain the mold cavity shape, without stress risers and dimensional deformation or warping or going out of round, after removal from mold 16, as set out below.

In laying up the groups 14 of plys 13a, 13b, 13c and 13d, and with the groups 14 stacked upon one another, the order of stacking is that the top ply 13d in a group 14 is in contact with the bottom ply 13a of the group stacked thereon, and with the individual plys 13a and 13d of each group are in contact with ply 13a and 13d of the adjacent stacked groups. So arranged, the ply fibers at the junctions of which groups are at ninety (90) degrees to one another. To form the rim 10, as a balanced laminate, preferably six (6) groups 14 are laid up upon one another on mandrel 15, though, it should be understood other numbers of plys in multiples of fours can constitute a group, such as eight (8), and therefore other number of groups than six (6) can be laid up as the laminate, within the scope of this disclosure. Accordingly, it should be understood that, for another rim configuration such as a different bicycle rim than a mountain bike rim, or for a scooter rim, or for an even a larger vehicle rim, the number of groups 14 and plys within the group, can be varied for the type of vehicle the rim 10 is being formed for.

The mandrel 15, as shown in FIGS. 4, 5 and 6, is shaped around the sides 15a and across the bottom 15b thereof, to essentially have, the profile of the bottom area 12a of tire 12, that is shown in broken lines in FIG. 2. Shown in FIG. 2, the mandrel is split longitudinally at 17, dividing the mandrel into mirror image half sections 18 and 19 that include slot sections 18a and 19a, respectively, formed in the abutting surfaces, along split 17. Which slot sections 18a and 19a are each shown as stepped above the mandrel bottom 15b to form a slot that is to receive a bar 20 fitted therein. In practice, the mandrel half sections 18 and 19 are preferably formed as arcuate sections that are fitted together, each to form a continuous ring, and the half sections are, in turn, fitted together to form the mandrel 15. With the mandrel sections 18 and 19 held together as by fastener means, not shown, to form the continuous ring shaped mandrel 15. Which mandrel receives the ply groups 14 laid thereover, extending around the mandrel, and with the groups 14 sides bent over the mandrel top edges, forming the rim hook ends 31a and 31b, as shown in FIGS. 2, 5 and 6. After curing, as set out below, the bar 20 sections are removed, as shown in FIG. 6, allowing the mandrel arcuate sections 18 and 19 to collapse towards one another and allow them to individually be removed from the rim 10, passing between the rim hook ends 31a and 31b, as shown in FIG. 6, and as discussed hereinbelow.

To lay up the groups 14 of plys 13a, 13b, 13c and 13d, the groups, as shown in FIG. 3A, are cut to be long enough to fit around the mandrel 15 inner circumference, covering the mandrel bottom 15b and extending over the mandrel sides 15a, to lap over the mandrel sides 15a top edges, or the groups 14 edges are fitted into grooves 18b and 19b, respectively, that are formed along which top edges, as shown in FIG. 5. The over lapped portions of groups 14 of plys as are laid up over the mandrel top edges or as are fitted into grooves 18b and 19b, form the inwardly pointing hook ends 31a and 31b of the rim 10 side walls of the finished rim.

With the groups 14 laid up over mandrel 15 that is formed in sections that are joined into a continuous ring and the assembly is fitted into mold 16 that includes a mold base 21. The mold base 21 has a cavity 22 formed therein that duplicates the rim 10 outer surface. A cap 23 is included that is joined in sections to be continuous for fitting over the mold open end and has a center groove 24 and side grooves 25a and 25b that individually receive and press against, respectively, the center bar 20 and in-turned top sections of the groups 14 of plys as have been fitted into the mandrel grooves 18b and 19b. So arranged, the mandrel 15 applies pressured onto the inner surface of the laid up groups 14, in the mold cavity 22, compacting the laid up groups 14 between the mold and mandrel surfaces. Heat is added through mold 16 such that the groups 14 of plys that have been coated or impregnated with an epoxy resin are cured, with the resin flowing through and binding the fibers together, forming the composite rim 10. Whereafter, the rim 10 containing the mandrel 15 is removed, as shown in FIG. 6, and the center bar 20 sections are pulled out from the mandrel sections 18 and 19 groove segments 18a and 19a. The mandrel sections 18 and 19 are thereby freed to individually pass out from between the rim 10 side walls 30a and 30b hook ends 31a and 31b.

The composite rim 10 can then be smoothed as by sanding, sand blasting, or other process or procedure for smoothing a surface and, as needed, the ends of hook ends 31a and 31b can be finished, as by passing a router therebetween to provide a desired spacing distance so that the hook ends snugly fit into mounting grooves 12b of tire 12, as shown in broken lines in FIG. 2, locking the tire 12 onto the rim 10.

The rim 10 can be drilled, forming holes 33 through a rim bottom web 32 that are to receive spoke ends fitted through and secured to the rim web. The spokes are connected, on their opposite ends, to a hub, and the rim 10, spokes and hub form the wheel 11, as shown in FIG. 1. The rim 10 laminate surface is then finished by an application of a urethane polymer coating 35, as shown in FIG. 2, that can itself be colored, can include colored chips, mica chips, or the like, and can serve as a base coat to be painted, or the like. The polymer coating 35 provides an enhancement to the overall rim strength, and, in addition, provides a finish to the glass fiber surface that creates a smooth, colorful appearance that in unaffected by ultra-violet rays, moisture, salt water, most chemicals, and most cleaners. The urethane polymer enhances rim strength and may be applied to both the rim 10 outer and inner surfaces, with the smooth finish on the rim inner surface to facilitate fitting tire 12 therein.

It should be understood that the invention in rim 10 is not limited to any particular arrangement of mandrel 15, so long as that arrangement allows the mandrel to be removed and pass between the inwardly facing rim side wall hook ends 31*a* and 31*b*. Accordingly, a mandrel to receive the individual groups 14 of individual plys 13*a*, 13*b*, 13*c* and 13*d*, can be any mandrel arrangement where the mandrel cross section can be reduced to allow the mandrel to pass out from within the finished rim 10, passing between the rim hook ends. For example, the mandrel, rather than being formed by expanding sections, can be a tubular shaped bladder that, when inflated with air, provides a surface to receive the groups 14 of fiber glass plys laid up thereover, and that, when deflated, will collapse sufficiently to be pulled out from between the rim side wall hook ends 31*a* and 31*b*. Such bladder may or may not including slots 18*b* and 19*b* formed around the side top edges, that the plys are fitted into to form the hook ends. With, if slots 18*b* and 19*b* are not provided, the hook ends 31*a* and 31*b* can then be formed by bending the edges of the groups of plys over the mandrel edges. For either procedure, the formed hook ends 31*a* and 31*b* need to be finished after mandrel removal, as with a router, or like tool, to where each hook end extends a desired distance inwardly from the rim side wall inner surface and is smooth so as to fit into the tire mounting rim groove.

Hereinabove has been set out a description of a preferred composite rim of the invention shown herein as a bicycle rim though, it should be understood the invention can be applied to rims additional to bicycle rims. Accordingly, it should be understood that the present invention can be varied within the scope of this disclosure without departing from the subject matter coming within the scope of the following claims, and a reasonable equivalency thereof, which claims we regard as our invention.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method of manufacturing a rim for a bicycle wheel, said method comprising:
   wrapping plys of fibers in a resin matrix around a mandrel;
   curing the plys to form the rim;
   reducing a size of the mandrel to allow the mandrel to be removed from the rim; and
   removing the mandrel from the rim.

2. The method of claim 1, wherein reducing a size of the mandrel comprises deflating an inflatable portion of the mandrel.

3. The method of claim 1, wherein reducing a size of the mandrel comprises disassembling the mandrel into two or more constituent members.

4. The method of claim 3, wherein disassembling the mandrel comprises removing a center section that, when removed, shortens a distance across the mandrel so as to allow the mandrel, after said curing, to be removed from the rim.

5. The method of claim 1, further comprising shaping inwardly extending hooks from edges of the cured plys of the rim, said hooks extending around the rim that will hook into side wall grooves of a bicycle tire.

6. The method of claim 5, wherein said hooks are shaped with a turning router blade.

7. The method of claim 1, wherein said fibers are made of carbon.

8. The method of claim 1, wherein the fibers of a particular ply are arranged in a common direction and wrapping said plys further comprises disposing a sequence of plys on said mandrel such that the fibers in successive plys are arranged at different crossing angles.

9. The method of claim 1, further comprising drilling holes to receive spokes around a circumference of said rim.

10. The method of claim 1, further comprising coating a urethane polymer over the rim after curing.

11. A method of manufacturing a rim for a bicycle wheel, said method comprising:
    wrapping plys of fibers in a resin matrix around a mandrel, the mandrel comprising multiple pieces;
    curing the plys to form the rim;
    disassembling the multiple pieces of the mandrel to allow the multiple pieces of the mandrel to be removed from the rim.

12. The method of claim 11, wherein the multiple pieces of the mandrel comprise a removable center section that, when removed, shortens a distance across the mandrel so as to allow the mandrel, after curing, to be removed from the rim.

13. The method of claim 11, further comprising shaping inwardly extending hooks from edges of the cured plys of the rim, said hooks extending around the rim that will hook into side wall grooves of a bicycle tire.

14. The method of claim 13, wherein said hooks are shaped with a turning router blade.

15. The method of claim 11, wherein said fibers are made of carbon.

16. The method of claim 11, wherein the fibers of a particular ply are arranged in a common direction and wrapping said plys further comprises disposing a sequence of plys on said mandrel such that the fibers in successive plys are arranged at different crossing angles.

17. The method of claim 16, wherein fibers in a first ply on the mandrel are parallel to a circumference of the mandrel and fibers in a last ply on the mandrel are perpendicular to a tangent to the mandrel circumference.

18. The method of claim 16, wherein said crossing angles are less than 90 degrees and greater than 45 degrees.

19. The method of claim 11, further comprising drilling holes to receive spokes around a circumference of said rim.

20. The method of claim 11, further comprising coating a urethane polymer over the rim after curing.

* * * * *